(12) United States Patent
Whitmyer, Jr.

(10) Patent No.: US 11,340,770 B2
(45) Date of Patent: May 24, 2022

(54) USABILITY MODE FOR DEVICES

(71) Applicant: Wesley W. Whitmyer, Jr., Stamford, CT (US)

(72) Inventor: Wesley W. Whitmyer, Jr., Stamford, CT (US)

( * ) Notice: Subject to any disclaimer, the term of this patent is extended or adjusted under 35 U.S.C. 154(b) by 0 days.

(21) Appl. No.: 16/271,252

(22) Filed: Feb. 8, 2019

(65) Prior Publication Data
US 2020/0257438 A1 Aug. 13, 2020

(51) Int. Cl.
*G06F 3/048* (2013.01)
*G06F 3/04847* (2022.01)
*G06F 8/65* (2018.01)
*G06F 9/451* (2018.01)

(52) U.S. Cl.
CPC .......... *G06F 3/04847* (2013.01); *G06F 8/65* (2013.01); *G06F 9/451* (2018.02)

(58) Field of Classification Search
CPC .......... G06F 3/1225; G06F 9/445; G06F 8/65; G06F 9/4406; G06F 13/102; G06F 3/0484; G06F 3/0482; G06F 8/71; G06F 8/61; G06F 8/658
See application file for complete search history.

(56) References Cited

U.S. PATENT DOCUMENTS

| | | | | |
|---|---|---|---|---|
| 6,151,643 A * | 11/2000 | Cheng | ....................... | G06F 8/62 709/200 |
| 9,372,885 B2 * | 6/2016 | Kasterstein | ........... | G06F 16/245 |
| 2005/0159926 A1 * | 7/2005 | Saito | .................... | G06F 9/44505 702/186 |
| 2005/0210459 A1 * | 9/2005 | Henderson | ................ | G06F 8/65 717/168 |
| 2005/0262076 A1 * | 11/2005 | Voskuil | ...................... | G06F 8/65 |
| 2010/0306762 A1 * | 12/2010 | Lindberg | ................... | G06F 8/61 717/176 |
| 2012/0099024 A1 * | 4/2012 | Ryu | .................... | H04N 21/8166 348/730 |
| 2012/0272231 A1 * | 10/2012 | Kwon | ...................... | H04W 4/60 717/173 |
| 2013/0104114 A1 * | 4/2013 | Reiss | ....................... | G06F 8/656 717/170 |
| 2013/0117681 A1 * | 5/2013 | Veys | ....................... | G06Q 10/10 715/739 |
| 2013/0283305 A1 * | 10/2013 | Hirsch | ...................... | G06F 8/20 725/14 |
| 2013/0305218 A1 * | 11/2013 | Hirsch | ...................... | G06F 8/36 717/106 |
| 2013/0339942 A1 * | 12/2013 | Brunsman | ................. | G06F 8/61 717/173 |
| 2014/0282480 A1 * | 9/2014 | Matthew | ................... | G06F 8/60 717/172 |

(Continued)

OTHER PUBLICATIONS

Yun et al., Downloadable User Interface forMobile device, 2018, IEEE; 4 pages.*

*Primary Examiner* — Linh K Pham
(74) *Attorney, Agent, or Firm* — Whitmyer IP Group LLC

(57) ABSTRACT

A device for selectively updating an electronic device is provided. An update to a graphic user interface is loaded onto a device. At least one feature in said update includes an update to the electronic user interface. A user may select if the update to the electronic user interface is implemented on a device. The device includes a display on which the graphic user interface is displayed.

17 Claims, 3 Drawing Sheets

(56) References Cited

U.S. PATENT DOCUMENTS

| | | | |
|---|---|---|---|
| 2015/0278219 A1* | 10/2015 | Phipps | G06F 16/951 |
| | | | 707/711 |
| 2016/0048383 A1* | 2/2016 | Nachimuthu | G06F 8/65 |
| | | | 717/173 |
| 2016/0162286 A1* | 6/2016 | Bankole | G06F 8/65 |
| | | | 717/170 |
| 2017/0004113 A1* | 1/2017 | Gore | G06F 40/109 |
| 2017/0124564 A1* | 5/2017 | Pi Farias | G06Q 20/203 |
| 2018/0150307 A1* | 5/2018 | Yamada | G06F 9/44536 |
| 2019/0012163 A1* | 1/2019 | Konno | G06F 8/65 |

* cited by examiner

USABILITY MODE FOR DEVICES

TECHNICAL FIELD

This disclosure relates to electronic user interfaces, specifically graphic user interfaces, software which improves upon graphic user interfaces, and a method of customization of the electronic user interfaces.

BACKGROUND

Mobile and other electronic devices contain large amounts of firmware and software installed on the devices, such as web browsers, camera drivers, applications and more. Due to the large amount of software, updates to the electronic user interfaces are often released by developers.

These updates may change the appearance of the graphic user interface, menus, or other aspects of the operating system. However, as the graphic user interface is changed the user will lose familiarization with the electronic user interface. Constant changes in the user interface can cause confusion to a user's ability to locate and/or navigate certain menus, toggles, or buttons.

Updates become significantly more of a hassle than a benefit if the updates cause the user to no longer efficiently navigate the electronic user interface.

SUMMARY

It is thus an object of the invention to create a usability mode for an electronic device. The usability mode does not automatically change the electronic user interface when updates applied to the electronic device.

Another object of the invention is to present all of the updates to the electronic user interface in a list. The list may categorize updates. It is further possible to provide which provide, for example, more depth in sorting the updates. The list may be searchable, for example by text, in order for a user to quickly navigate to specific updates or folders of updates the user may desire. The list may contain notes and/or titles about the update. Optionally, the list may allow the user to see an example of how the update will change the feature of the electronic user interface.

Updates can be selectively installed or queued for selection and installation. Updates in the queue may be installed at a later date if not immediately selected. Updates may be downloaded automatically or downloaded upon selection. Not downloading updates onto the electronic device will save memory and network usage, but reduce the speed at which the update can be installed. Therefore, it is preferable to allow the user to choose whether updates are automatically downloaded or not to better suit their needs.

An update filtering system can categorize updates into updates related to the electronical user interface and updates that are related to security, firmware, or other features of the device. The filtering system is configured to create as many categories as desired. Different users may also want to select whether their firmware, security or other aspect of the electronic device is updated. The user would then not be limited to only selecting updates to the graphic user interface, but could selectively update all updates on the device.

Each update to the electronic user interface modifies at least one feature in the electronic user interface. For example, the feature could be the size of the icons or how a pop-up appears. Other features of a graphic user interface are well known in the art. Further, the update may modify a feature of the electronic user interface that changes the sequence of operations of the electronic user interface. The sequence of operations could be, for example, the order the electronic device completes task. For example, if the user wants to change the brightness of the phone, he would typically enter the 'display' tab. After the update the sequence may change where he opens a 'display' tab and then has to go into a 'power' tab. The feature changes may also add or remove functions or options of the electronic user interface. A display will show the user the list of updates that a user may select from.

The electronic user interface may also be a graphic user interface. For most electronic devices, a display will be required to show the electronic user interface. This display may have a touchscreen, or be open to other input methods, for example, a keyboard, mouse, or a controller.

Other features and aspects of the invention will become apparent from the following detailed description, taken in conjunction with the accompanying drawings, which illustrate by way of example the features in accordance with embodiments of the invention. The summary is not intended to limit the scope of the invention, which is defined solely by the claims attached thereto.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, that it does not intend any of the appended claims or claim elements to invoke 35 U.S.C. 112(f) unless the words "means for" or "step for" are explicitly used in the particular claim.

Figure 1:
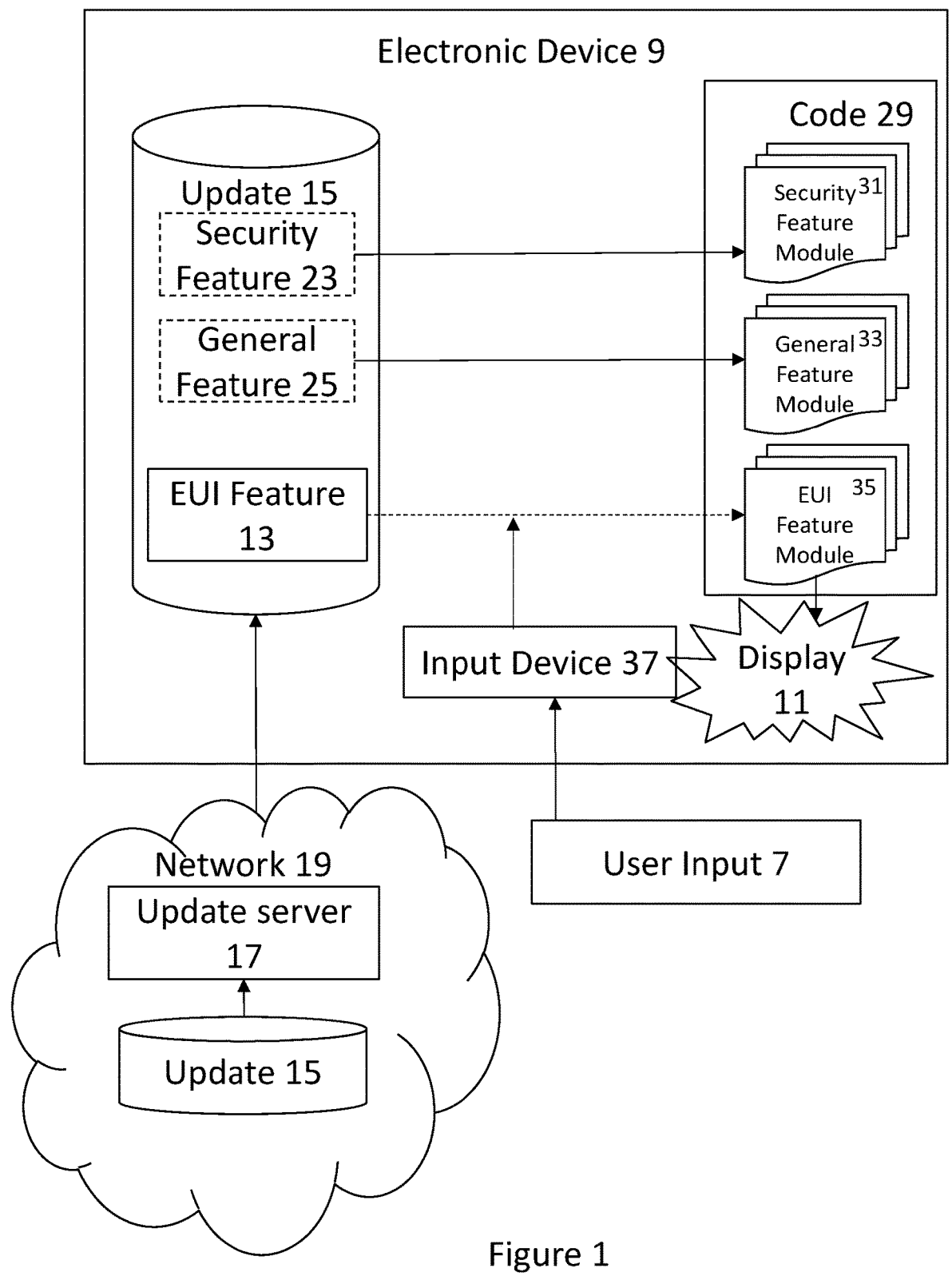
FIG. 1 is a block diagram of an example of the usability mode for an electronic device.

FIG. 1 shows a usability mode for an electronic device 9. The electronic user interface 1 may be shown on a display 11. The electronic user interface 1 may be updated through user interface modifying features 13.

User interface modifying features 13 may update various aspects of the electronic user interface 1. This may include changing icons and menus, including where and how they appear, adding new adjustment options, or modifying a sequence of operations. In another example, a feature 13 may move a display brightness toggle from being a settings menu, to a display settings submenu. In addition, a new function may allow the user to adjust the gamma of a display when this was previously not an option. Other features would be known to one skilled in the art.

The electronic user interface 1 is displayed to a user via display 11. User input 7 is a selection made by a user of which update features 13 to incorporate into the electronic user interface 1. The User input 7 is made through an input device 37 of the electronic device 9. Users can select a personalized collection of features 13 for incorporation into their electronic user interface 1. The display 11 may also list the electronic user interface modifying features 13 that have been downloaded or are available to be downloaded. This list may be sorted by new, by feature, or by any other sorting method known in the art.

The user communicates to the electronic device 9, via a user input 7, which of the features 13 the user would like to implement to the electronic user interface 1. The selected update, which comprises the selected electronic user interface features 13, is then applied to the electronic user interface 1. The result is an updated electronic user interface. The updated electronic user interface only differs from the original electronic user interface by the features 13 selected by the user input 7. In certain situations the user may select no features 13, in which case the electronic user interface will not be updated.

Figure 2:
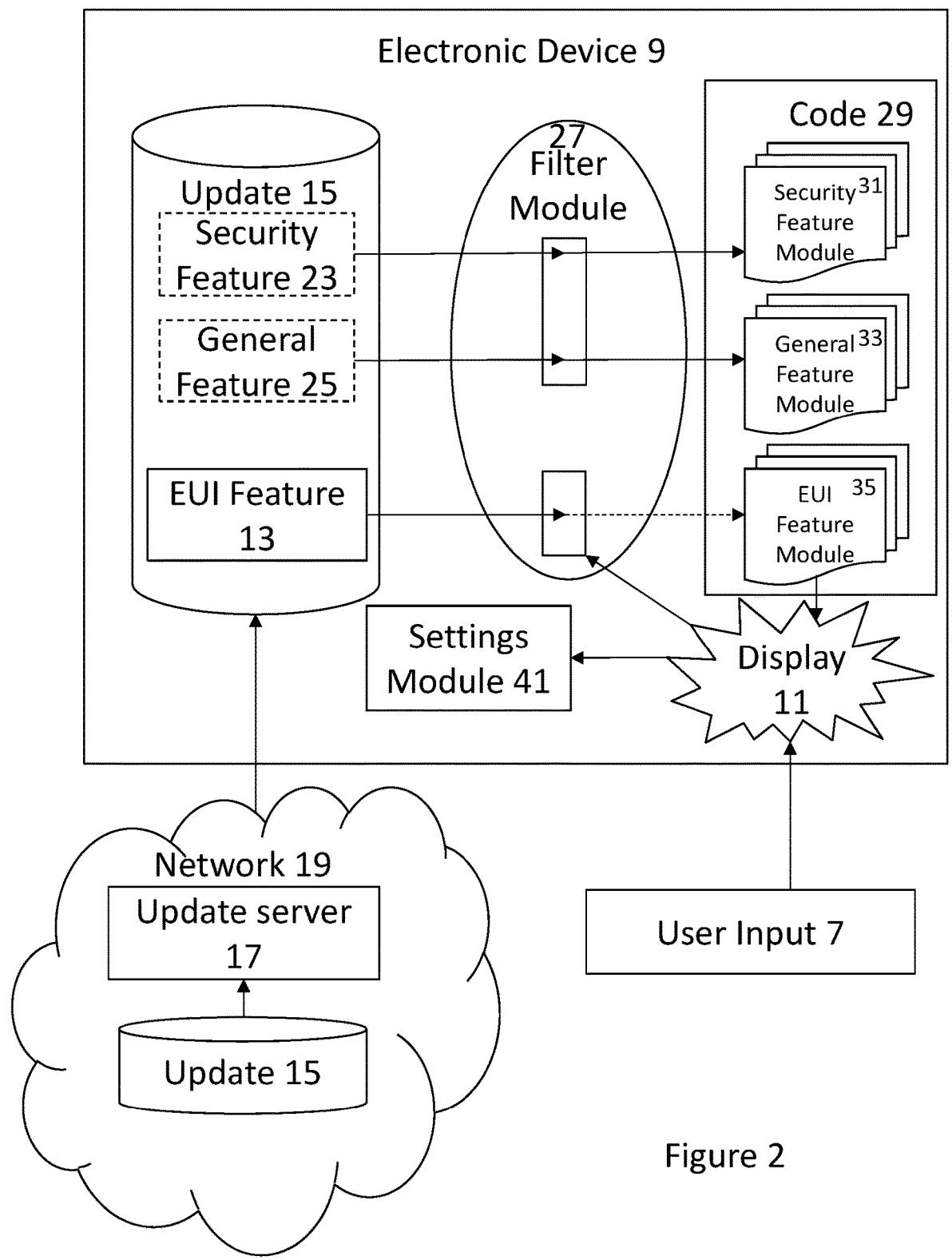
FIG. 2 is a block diagram of an electronic device connected to a network to implement a usability mode.

FIG. 2 portrays an electronic device 9 receiving an update 15. The update 15 is loaded onto the electronic device 9 from a network 19. The update 15 may be downloaded onto the device after the user selects which features they want, or in advance of feature selection. The update 15 contains various updates to other electronic device 9. These may include security updates 23, electronic user interface updates 13, or just general feature updates 25. As shown in FIG. 2, only the electronic user interface features 13 are not automatically updated. In other embodiments, the security features or other general features may also be selectively updated if a user did not want specific security or general updates.

A filter 27 is used between the update 15 and the code of the electronic device 29. The filter 27 receives instructions from the user input 7. The user decides which updates they want and inputs this information through a display 11 on the electronic device 9. The filter 27 uses the user input 7 to allow specific updates to be installed, while preventing other updates from being installed. To install selected features from the update 15 to the electronic device 9, the features 13, 25, and 23 which have been selected are installed into the code 29. The code 29 comprises different parts including security feature's module 31, general feature's module 33, and electronic user interface feature's module 35.

The filter 27 may also contain a method of separating the updates into smaller subsections of updates. For example, within the electronic user interface features 13, the filter 27 may present the user with a list of updates to the menus, a list of updates to the display size, etc. In this way, the user can, for example, select all of the features that add new functions to the electronic user interface, while preventing the features that modify the look of the electronic user interface.

The filter module 27 may also divide the update into smaller subsections than the developer originally provided. Here, the developer may provide an update 15 to the update server 17, available over network 19. The network 19 might be the internet. If the update 15 is provided to the electronic device 9 in large portions, the filter module 27 may read the update 15 and separate the information into small subsections.

Figure 3:
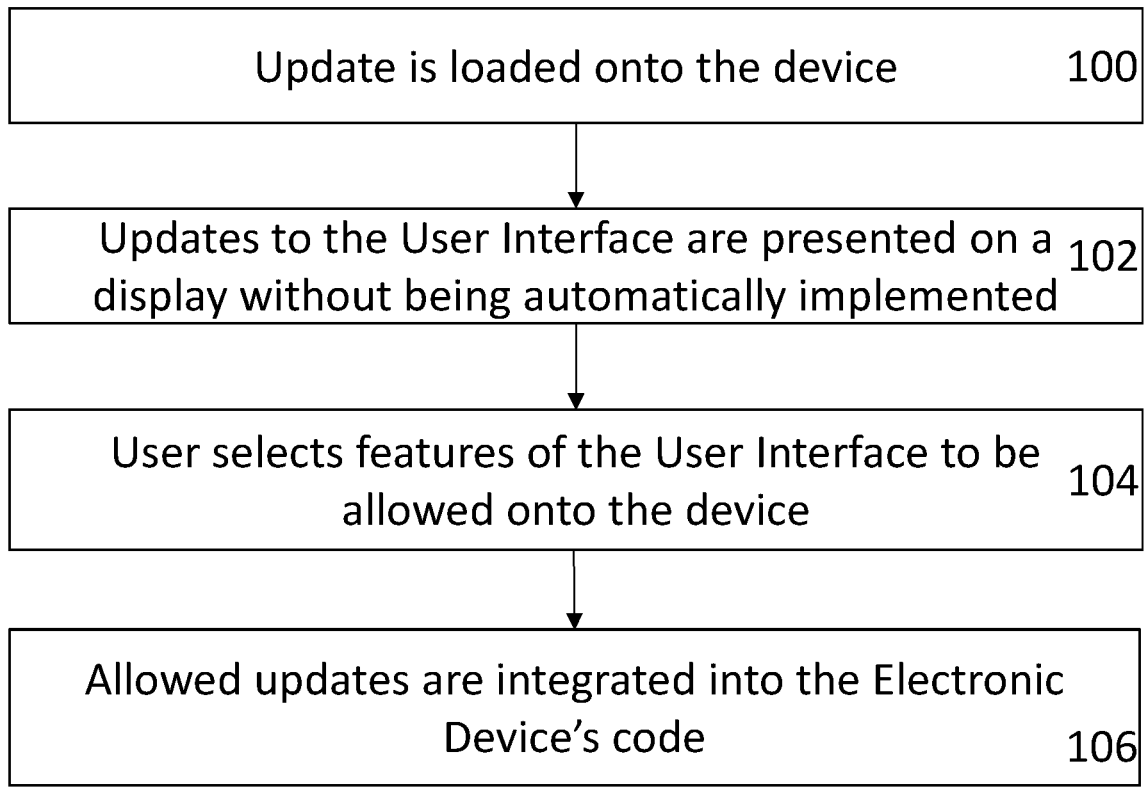
FIG. 3 is a flowchart of one embodiment of a process of selectively updating an electronic device.

FIG. 3 shows the steps in which an update is installed onto an electronic device. In the first step 100, the updates is loaded onto the device. This includes all of the features that the developer of the update has included in the update. Optionally there may be a method of separating the update into discrete parts, or the update may be delivered in discrete parts by the developer. Another option is to have the update in larger parts.

In step 102 the updates to the user interface are presented on a display without being automatically implemented. Therefore, the user is able to see the list of updates that can be selected from a list of options. This list may be sorted into multiple categories, or displayed all at once.

Optionally, each update will contain a sample of what the update will cause the new electronic user interface to look like or function like. Additionally, there may be a description of the update besides just the title of the update. This allows the user to better understand how the update will function and see if it is desirable or not.

The third step 104 is the user selects features of the user interface to be allowed onto the device. The user could select either the updates that they wanted to implement onto their electronic user interface or they could select the updates that they did not want to implement. Updates that are not selected can either be deleted from the electronic device, or saved in case the user wants to implement them at a later time. The unselected updates may be deleted or saved automatically.

In the fourth step 106, the allowed updates are integrated into the electronic device's code. This may include both the selected updates to the electronic user interface and updates to the systems software that does not involve the electronic user interface. The non-electronic user interface updates may also be immediately updated upon downloading to the electronic device, and therefore will not wait until the user selects the features.

When the updates are integrated into the code, the user will see that reflected on the electronic user interface. If the user does not like the change to the electronic user interface there may be an option within the display to revert that aspect of the electronic user interface to remove the new update.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for selectively updating an electronic user interface comprising:
   a device with an electronic user interface; an update loaded to the device; at least one first part in said update, the at least one first part being displayed in a list, the at least one first part when applied to the device modifying at least one first feature in said electronic user interface, the at least one first part being categorized as a first category of update, wherein the first category when applied to the device modifies said electronic user interface;
   at least one second part in said update, the at least one second part when applied to the device modifying at least one second feature unrelated to said electronic user interface, the at least one second part being categorized as a second category of update, wherein the second category when applied to the device does not modify said electronic user interface;
   a display on the device for presenting said at least one first part in the list; and an input device for permitting a user input on selecting the at least one first part in the list;
   wherein updates are applied to the device based on the user input, and
   wherein when the at least one first part is selected, the at least one first feature in said electronic user interface is updated regardless of whether the at least one second feature unrelated to said electronic user interface is updated, and when the at least one first part is not selected, the at least one first feature in said electronic user interface is not updated regardless of whether the at least one second feature unrelated to said electronic user interface is updated.

2. The device with a usability mode of claim 1 wherein said electronic user interface is a graphic user interface.

3. The device with a usability mode of claim 1 wherein said electronic user interface is presented on said display.

4. The device with a usability mode of claim 3 wherein said display is a touch screen.

5. The device with a usability mode of claim 1 wherein said update is downloaded from a server.

6. The device with a usability mode of claim 1 wherein said update is uploaded.

7. The device with a usability mode of claim 1 wherein the input device is a touch screen of the display.

8. The device with a usability mode of claim 1 wherein said at least one first feature modifies a look of said electronic user interface.

9. The device with a usability mode of claim 1 wherein said at least one first feature modifies a sequence of operations in said electronic user interface.

10. The device with a usability mode of claim 1 wherein said at least one first feature adds functions to said electronic user interface.

11. The device with a usability mode of claim 1 wherein said at least one first feature adds options to said electronic user interface.

12. The device with a usability mode of claim 1 wherein said user input is presented on said display.

13. The device with a usability mode of claim 1 wherein said user input is an option in settings on the device permitting individual selection of electronic user interface modifications.

14. The system of claim 1, wherein the device is a mobile device.

15. A device having a usability mode comprising: an electronic user interface; a server having an updated;
   a filter module for categorizing the update, including a first category of update related to electronic user interface and a second category of update related to electronic user interface, wherein the first category when applied to the device modifies a first feature in said electronic user interface, and the second category when applied to the device modifies a second feature in said electronic user interface;
   a display for presenting information regarding the update in a list including at least one first part and at least one second part, the at least one first part when selected and implemented to the device updating said electronic user interface by modifying at least one of the first feature in said electronic user interface, the at least one first part being categorized as the first category, the at least one second part when selected and implemented to the device updating said electronic user interface by modifying at least one of the second feature in said electronic user interface, the at least one second part being categorized as the second category;
   the filter module for selecting which parts to implement on the device, wherein a user selects which parts to implement on the device by sending a signal to the filter via the display, and wherein when the at least one first or second part is selected, in said electronic user interface is updated in the at least one of the first feature or the at least one of the second feature, respectively, and when the at least one first or second part is not selected, said electronic user interlace is not updated in the at least one first feature or the at least one of the second feature, respectively.

16. The usability mode for a device of claim 15 wherein the updated is loaded to the device.

17. The usability mode for a device of claim 15 wherein the filter module is configured to show the user the modification the update will make before the update is implemented.

* * * * *